United States Patent [19]
Kishi et al.

[11] Patent Number: 4,555,590
[45] Date of Patent: Nov. 26, 1985

[54] METHOD AND APPARATUS FOR ENTERING GRAPHICS

[75] Inventors: Hajimu Kishi, Hino; Masaki Seki, Tokyo; Kunio Tanaka, Hachioji, all of Japan

[73] Assignee: Fanuc Ltd, Minamitsuru, Japan

[21] Appl. No.: 469,824

[22] Filed: Feb. 25, 1983

[30] Foreign Application Priority Data

Feb. 27, 1982 [JP] Japan .................. 57-31495

[51] Int. Cl.[4] ............................. G08C 21/00
[52] U.S. Cl. ....................... 178/18; 340/706
[58] Field of Search ............... 178/18, 19, 20; 340/706, 700, 724, 727, 728; 364/191, 192, 194, 520

[56] References Cited

U.S. PATENT DOCUMENTS 3,867,616 2/1975 Kovelitz et al. .................. 364/189
4,042,866 8/1977 Morita et al. .................... 318/568

FOREIGN PATENT DOCUMENTS 0044192 7/1981 European Pat. Off. .

OTHER PUBLICATIONS

IBM Technical Disclosure Bulletin, Oct. 1975, New York, U.S.A., P. L. Gardner et al.: "Paper Menus and Keyboards for Digitizing Tablets", (pp. 1589–1590).
"Taschenbuch Elektrotechnik", editor E. Philippow, Grundlagen, 1963, VEB Verlag Technik, Berlin, D.E., Transformation Kartesischer Koordinaten.
European Search Report completed Jun. 22, 1983, The Hague.

Primary Examiner—Stafford D. Schreyer
Attorney, Agent, or Firm—Staas & Halsey

[57] ABSTRACT

A graphic form or figure drawn on a drawing and larger than the read-out area of a tablet is divided into graphic patterns which are successively read by displacing the drawing. The extent to which the drawing is displaced is recognized, and graphic data read before and after the drawing is displaced is converted into data on one coordinate system and entered as inputs. For entering the graphic data, two points are specified on the drawing, and the coordinates of the specified points prior and subsequent to displacement of the drawing are read and stored in first through fourth registers. The stored coordinates and the coordinates of points on the figure are entered into a coordinate transformation unit which effects arithmetic operations of coordinate transformation.

7 Claims, 9 Drawing Figures

METHOD AND APPARATUS FOR ENTERING GRAPHICS

CROSS REFERENCES TO RELATED APPLICATIONS

This application is related to U.S. applications having Ser. Nos. 470,453; 469,814; 469,825; 470,484; 470,483; and 470,482, the same inventors and assigned to the assignee of the present invention.

BACKGROUND OF THE INVENTION

The present invention relates to a method and apparatus for entering graphics, and more particularly to a graphic entering method and apparatus for use in entering graphics employing a tablet.

A numerically controlled machine tool (hereafter referred to as an NC machine tool) is operated in a manner specified by a machining program stored on an NC tape to subject a workpiece to prescribed machining. To create an NC tape for a cutting operation, numerical control information and other machining conditions are punched into a paper tape in accordance with predetermined rules. The numerical control information includes all the data necessary for machining, such as numerical values obtained from a design drawing and relating to the dimensions of the workpiece that is to be machined, feed speed, and the like. When machining the workpiece by means of an NC machine tool, the NC tape which has been prepared is fed into the tape reader of a numerical control device so that the various instructions recorded on the NC tape may be read successively, the numerical control device responds by executing the read instructions to cause the machine tool to machine the workpiece as prescribed. Since considerable time and experience is required to create the information stored on an NC tape, an apparatus for preparing an NC tape automatically has recently been developed and put into practical use. The apparatus includes a graphic display, keyboard and printer and is extremely useful in preparing NC tapes in a simple, accurate and rapid manner. Such an apparatus for automatically preparing NC tapes is equipped with a microcomputer with its internal main memory for storing the NC tape preparation software, or system program.

To create a machining program by means of the above-described apparatus, the prescribed system program is loaded into the main memory, and a so-called "part program" consisting of a group of data specifying the contour of a part, namely the path of a tool for cutting the contour, must be created and entered in accordance with predetermined rules. The preparation of such a part program is troublesome and time-consuming, and can only be accomplished by a programmer having considerable programming skill. With these difficulties in view, there has been a demand for a system capable of entering graphics simply by specifying a plurality of points on such graphics, and attention has turned to a graphic entering apparatus employing a tablet.

Such a graphic entering apparatus using a tablet can easily enter graphics even if the dimensions thereof are unknown. However, where the size of a graphic form or figure on a drawing to be entered is greater than the read-out area of a tablet, the entire figure cannot be entered.

SUMMARY OF THE INVENTION

It is an object of the present invention to provide a method and apparatus capable of entering graphics even when the overall figure on a drawing is larger than the read-out area of a tablet.

Where the entire figure on a drawing is larger than a tablet read-out area, the figure is divided successively into graphic patterns by displacing the drawing, which patterns are entered by the tablet until all graphic data are entered as inputs. By recognizing the extent of the displacement of the drawing and effecting corrective processing dependent on the drawing displacement, the entire figure can be correctly entered. As an example, when it is found that a drawing is translated in the X-axis direction or horizontal direction by a distance of a and in the Y-axis direction or vertical direction by a distance of b, the graphic data entered after the drawing has been displaced can be converted into data for the same coordinate system as that for the data prior to the drawing displacement. To effect this coordinate transformation, two points are specified in advance on the drawing, and the coordinates of the two points are read and stored before and after the drawing is displaced. The stored coordinates are employed to perform arithmetic operations for coordinate transformation.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
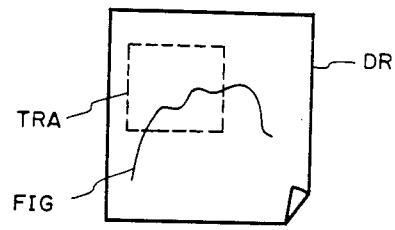
FIG. 1 is a plan view illustrative of an occasion in which a drawing or figure to be entered overextends the read-out area of a tablet.
Figures 2A, 2B:
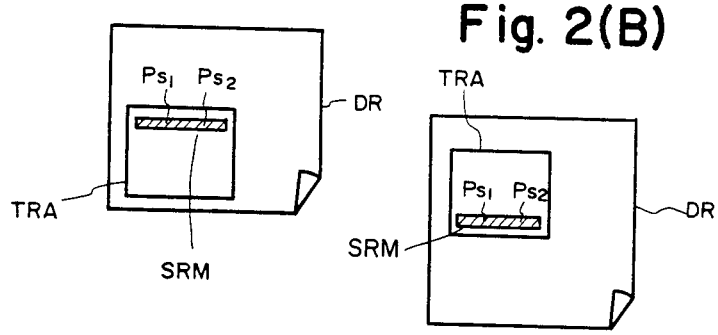
FIG. 2 is illustrative of the principles of the present invention, FIG. 2(A) showing a drawing before it is displaced, and FIG. 2(B) the drawing after it has been displaced.

FIG. 1 shows a graphic form or figure FIG to be entered according to a graphic entering apparatus according to the present invention, the figure FIG being greater than the read-out area of a tablet input device TRA in the graphic entering apparatus. FIG. 2 is explanatory of the principles behind the present invention. FIG. 2(A) shows a drawing positioned before it is displaced, and FIG. 2(B) shows the drawing after it has been displaced. Designated in FIG. 2 at SRM is a special area indicated on the drawing which allows the operator to know how the drawing has been displaced. Prior to displacement of the drawing (FIG. 2(A)), the coordinates (x01, y01), (x02, y02) respectively of specified points Ps1, Ps2 are entered and stored by a coordinate designating device. After the drawing has been displaced (FIG. 2(B)), the coordinates (x11, y11), (x12, y12) of the specified points Ps1, Ps1 are entered again. In moving the drawing, care should be exercised to keep the specified points Ps1, Ps2 included in a read-out area TRA of the tablet at all times.

Figure 3:
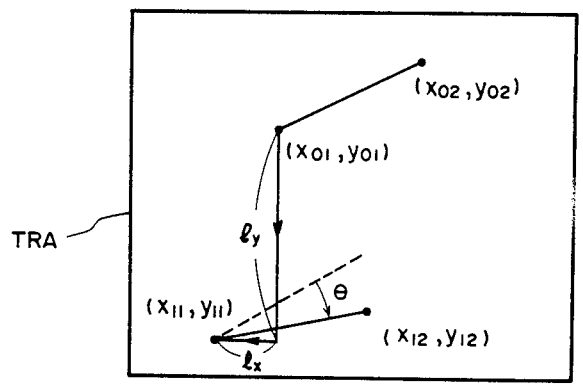
FIG. 3 is a plan view illustrating two specified points Ps1 and Ps2 before and after the drawing is displaced, the points being displayed in superimposed relation to the read-out area of the tablet.
Figure 4:
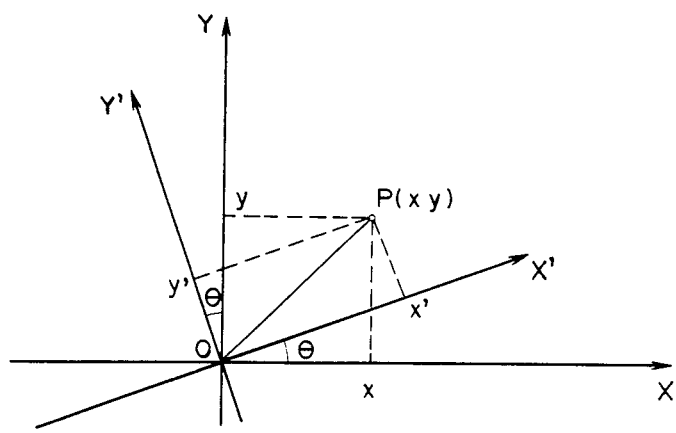
FIG. 4 is a diagram showing the manner in which a coordinate system is rotated through the angle of $\theta$.

FIG. 3 is illustrative of the specified points Ps1, Ps2 before and after the drawing is displaced, the points being superimposed on the tablet read-out area TRA. It is clearly seen from FIG. 3 that the drawing is translated downwardly or in the direction of $-y$ by a distance ly ($=y01-y11$), leftward or in the direction of $-x$ by a distance lx ($=x01-x11$), and rotated clockwise through an angle of $\theta$ degrees. Assuming that the angle $\theta=0$, coordinates (X1, Y1) entered after the drawing has been displaced can be converted into coordinates (X'1, Y'1) in the same coordinate system as that for the coordinates of the points entered prior to displacement of the drawing, by way of the coordinate transformation defined by:

$$X'1 = X1 + lx = X1 + (x01 - x11) \quad (1)$$

$$Y'1 = Y1 + ly = Y1 + (y01 - y11) \quad (2)$$

Where the angle $\theta \neq 0$, the transformation formulas (1) and (2) must be changed into equations which take the rotational angle $\theta$ into account. As an example, assume that the plane which is obtained by rotating the X-Y plane about the reference point O through the angle $\theta$, as shown in FIG. 4, is designated as an X'-Y' plane, the coordinates (x', y') of a point P on the X'-Y' plane can be expressed by the following equation, using the coordinates (x, y) of the point on the X-Y plane:

$$\begin{pmatrix} x' \\ y' \end{pmatrix} = \begin{pmatrix} \cos\theta & \sin\theta \\ -\sin\theta & \cos\theta \end{pmatrix} \begin{pmatrix} x \\ y \end{pmatrix} \quad (3)$$

Therefore, in the event of $\theta \neq 0$, transformation formulas should be created taking the above considerations into account.

Figure 5:
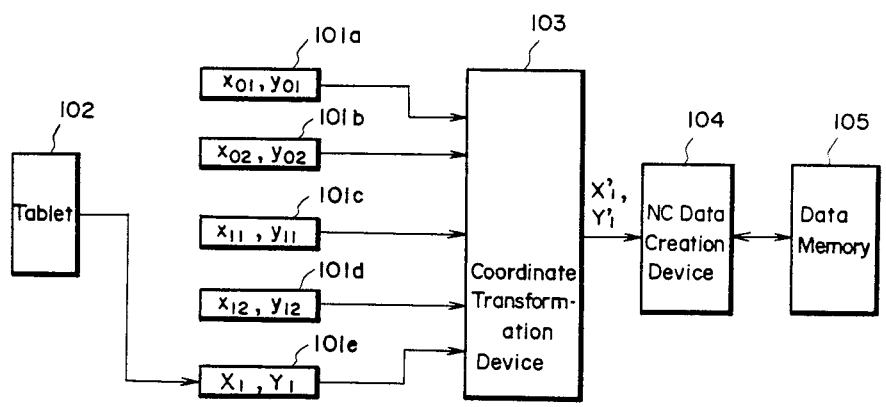
FIG. 5 is a block diagram of a system for entering graphics according to the present invention.

FIG. 5 is a block diagram of a graphic entering apparatus according to the present invention.

The apparatus include a first register 101a for storing the coordinates (x01, y01) of a first specified point prior to displacement of the drawing, a second register 101b for storing the coordinates (x02, y02) of a second specified point prior to the drawing displacement, a third register 101c for storing the coordinates (x11, y11) of the first specified point after the drawing has been displaced, and a fourth register 101d for storing the coordinates (x12, y12) of the second specified point subsequent to the drawing displacement. When the coordinates X1, Y1 of a given point are entered into a fifth register 101e by a tablet input device 102, a coordinate transformation unit 103 effects the arithmetic operations defined by the equations (1) and (2) where $\theta=0$ to convert the coordinates X1, Y1, and issues outputs indicative of coordinates X', Y'. An NC data creating apparatus 104 employs the converted coordinates X', Y' to create NC data, which are then stored in a data memory 105. NC data are successively created and stored in the data memory 105 in this manner. When it is necessary to displace the drawing several times, the coordinates of the first and second specified points are set in the third and fourth registers 101c, 101d each time the drawing is displaced and the same coordinate transformation process as above is carried out.

Figure 6:
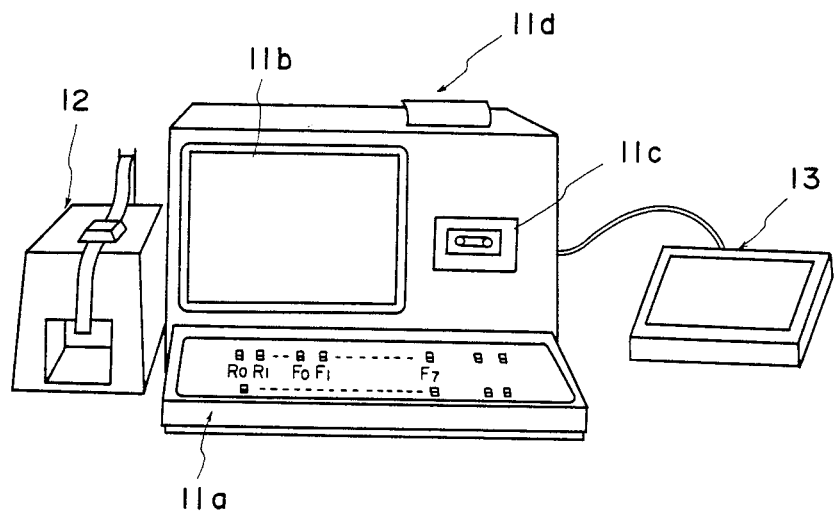
FIG. 6 is a perspective view of the general features of a system for creating numerical data.

FIG. 6 is a perspective view of a system for creating NC data in which the graphics entering method and apparatus of the present invention are incorporated. The system includes the main body 11 of an apparatus for creating NC data. The main body 1 comprises a keyboard 11a having a multiplicity of keys, a graphic display device 11b, a magnetic tape cassette 11c, a printer 11d, and a control unit (not shown). The latter is equipped with a microcomputer which executes processing for the input and output of information, for digitizing and for the creation of NC data, all executed by means of the tablet described hereinbelow, based on a system program stored previously in a memory device such as a ROM (read-only memory). The multiplicity of keys provided on the keyboard 11a are used by the operator for instructing operations to be performed through conversational interaction, for designating system program loading, and for entering NC data. The graphic display device 11b displays, in graphical form, coordinate values obtained by digitization of positions designated by the tablet, as well as input, numerical values, NC data and various messages or prompts for conversational interaction with the operator. The magnetic tape cassette 11c is used to enter a system program into the main body of the NC data creating apparatus 11. By way of example, when using a tablet to enter coordinate values directly from a drawing and prepare NC data, the software (system program) for digitizing processing must be fed into the main body 11. This is done by loading the digitizing program from the magnetic tape cassete 11c into the main body 11. To read the tape into the system, the operator need only touch a load button on the keyboard 11a after the tape cassette has been set in place. The printer 11d is adapted to print out characters which appear on the screen of the graphic display device 11b, data punched in a paper tape, described later, and information which has been written into the loaded magnetic tape. The system also includes a paper tape reader/puncher 12 for preparing an NC tape by punching a paper tape with perforations indicative of the NC data prepared by the main body 11, and for reading NC or other data which has already been punched into an NC tape. The system tablet, designated at 13, employs a coordinate designating device such as a cursor unit or stylus pen for designating coordinates to input positional coordinates from a drawing laid on the tablet surface, these coordinates being fed into the main body 11 as an input thereto. The system tablet 13 corresponds to the tablet input device 102 shown in FIG. 5.

Figure 7:
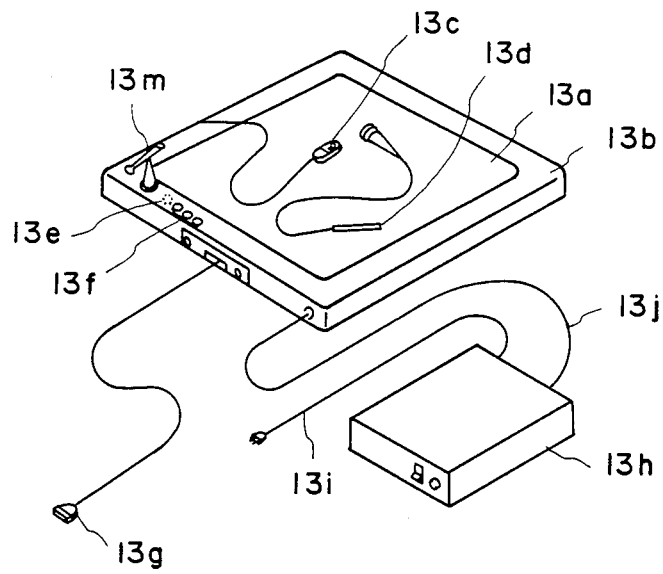
FIG. 7 is a perspective view of a tablet input device in the system shown in FIG. 6.

FIG. 7 shows in perspective the tablet 13 in greater detail. The tablet 13 comprises a tablet main body or board 13a, a tablet cover 13b, a cursor unit 13c, a stylus pen 13d, a buzzer 13e, a group of lamps 13f indicating, e.g., coordinate input mode and introduction of power, an input/output connector 13g for connecting the tablet 13 to the main body 11, a power unit 13h for supplying the tablet body 13a with D.C. power, an A.C. cable 13i, a D.C. cable 13j for connection between the tablet body 13a and power unit 13h, and a pen stand 13m for holding the stylus pen 13 when not in use. The cursor unit 13c or stylus pen 13d is used to enter coordinate and other data.

Figure 8:
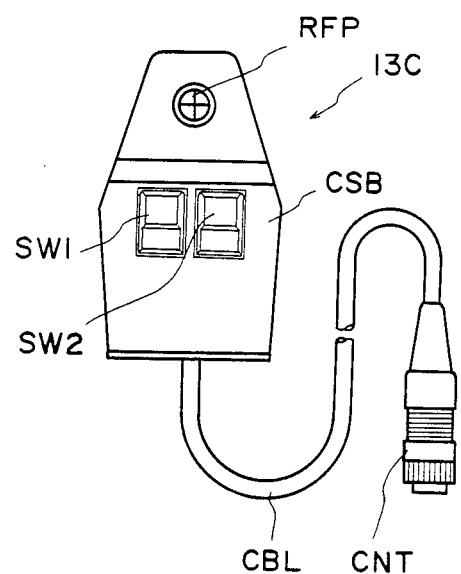
FIG. 8 is an enlarged, top view of a cursor unit included in the device of FIG. 7.

The details of the cursor unit 13c are illustrated in the enlarged view of FIG. 8, in which a top view of the cursor unit is shown. The cursor unit 13c has a main body CSB, first and second switches SW1, SW2, a position reader PR, a connector CNT and a cable CBL leading from the connector CNT to the main body CSB. To enter the coordinates of a point, the intersection Pc of the cross hairs provided on the position reader PR is aligned with the desired point on a drawing laid on the tablet body, followed by depressing the first switch SW1 or the second switch SW2.

The present invention is highly advantageous in that the graphic form on a drawing can fully be entered even if the entire drawing is larger than the tablet read-out area. The present invention is particularly suitable for use with an apparatus for creating NC data.

Although a certain preferred embodiment has been shown and described, it should be understood that many changes and modifications may be made therein without departing from the scope of the appended claims.

What we claim is:

1. A method of entering graphics data using a graphic data entering apparatus including a tablet having a read-out area and a coordinate designating device for designating a plurality of points on a figure of a drawing laid on the tablet over the read-out area, the figure having a size larger than the read-out area, said method comprising the steps of:
   (a) entering graphic data on the drawing on the read-out area and the coordinates of two specified points on the figure;
   (b) displacing the drawing over the tablet;
   (c) entering graphic data on the displaced drawing on the read-out area and the coordinates of the displaced two specified points on the figure; and
   (d) converting the coordinates of the graphics data entered before and after the drawing is displaced into graphic data for one coordinate system using the coordinates of said two specified points before and after the drawing is displaced.

2. A method as recited in claim 1, wherein step (d) comprises the step of:
   (di) converting the coordinates according to $$XC = X1 + X01 - X11 \text{ and } YC = Y1 + Y01 - Y11,$$

where XC and YC are the converted coordinates, X1 and Y1 are the unconverted coordinates and X01, Y01 and X11, Y11 are the coordinates of the two specified points and the displaced two specified points, respectively.

3. A method as recited in claim 2, wherein step (d) further comprises the step of:
   (dii) transforming the converted coordinates according to $$XRC = XC \cos \theta + YC \cos \theta \text{ and } YRC = YC \cos \theta - XC \sin \theta,$$

where XRC and YRC are the transformed converted coordinates when the drawing is rotated by the angle $\theta$.

4. An apparatus for entering graphic data, comprising:
   a tablet having a read-out area for placing a drawing thereon;
   a coordinate designating device, operatively connected to said tablet, for designating a plurality of points on the drawing laid over said read-out area;
   a first register group for storing the coordinates of two specified points at a first position on the read-out area which are read before the drawing is displaced;
   a second register group for storing the coordinates of the two specified points at a second position on the read-out area which are read after the drawing has been displaced; and
   a coordinate transformation unit, operatively connected to said first register group, said second register group, said tablet and said coordinate designating device, for effecting arithmetic operations of coordinate transformation using the contents of said first and second register groups to convert the coordinates of the graphic data entered before and after the drawing is displaced into graphic data for one coordinate system.

5. An apparatus as recited in claim 4, wherein said coordinate transformation unit converts the coordinates according to $$XC = X1 + X01 - X11 \text{ and } YC = Y1 + Y01 - Y11,$$

where XC and YC are the converted coordinates, X1 and Y1 are the unconverted coordinates and X01, Y01 and X11, Y11 are the coordinates of the two specified points and the displaced two specified points, respectively.

6. An apparatus as recited in claim 5, wherein said coordinate transformation unit further transforms converted coordinates according to $$XRC = XC \cos \theta + YC \cos \theta \text{ and } YRC = YC \cos \theta - XC \sin \theta,$$

where XRC and YRC are the transformed converted coordinates when the drawing is rotated by the angle $\theta$.

7. An apparatus for entering graphic data from a drawing larger than a tablet read-out area, comprising:
   coordinate designating means, having the tablet read-out area, for designating first and second pairs of points on the tablet read-out area and graphic points on the drawing, where the first pair of points corresponds to two drawing points and the second pair of points corresponding to the two drawing points after they have been displaced within the tablet read-out area by moving the drawing;
   storage means, operatively connected to said coordinate designating means, for storing the first and second pairs of points and for storing the graphic points; and
   conversion means, operatively connected to said storage means, for converting the graphic points into graphic points in a common coordinate system in dependence upon a displacement between the first and second pairs of points.

* * * * *